US005544008A

United States Patent [19]
Dimmick et al.

[11] Patent Number: 5,544,008
[45] Date of Patent: Aug. 6, 1996

[54] COMPUTER EXPANSION MODULE APPARATUS

[75] Inventors: Roger F. Dimmick; Gary A. Fitterer; Jeff A. Jajowka; William F. Otto; Jerry R. Rasmussen, all of Rochester; Terry L. Sobotta, Byron, all of Minn.

[73] Assignee: International Business Machines Corporation, Armonk, N.Y.

[21] Appl. No.: 269,266

[22] Filed: Jun. 30, 1994

[51] Int. Cl.⁶ .............................. G06F 1/16; H05K 7/04; H05K 9/00
[52] U.S. Cl. .......................... 361/684; 361/753; 361/818
[58] Field of Search ................................. 439/76.1, 928, 439/928.1; 364/708.1; 174/51; 361/684, 686, 752, 753, 754, 755, 730, 736, 796, 797, 798, 799, 800, 801, 803, 804, 818

[56] References Cited

U.S. PATENT DOCUMENTS

| | | |
|---|---|---|
| 4,642,735 | 2/1987 | Hodsdon et al. . |
| 4,744,006 | 5/1988 | Duffield ................................. 361/686 |
| 5,149,276 | 9/1992 | Dixon . |
| 5,227,957 | 7/1993 | Deters ................................... 361/686 |
| 5,260,854 | 11/1993 | Hileman et al. . |
| 5,278,730 | 1/1994 | Kikinis .................................. 361/686 |

*Primary Examiner*—Michael W. Phillips
*Attorney, Agent, or Firm*—Keith L. Hargrove; Andrew J. Dillon

[57] ABSTRACT

An expansion module for use in a computer system is disclosed. The expansion module holds a first card, which has a data processing unit and associated memory coupled together via a high speed internal local bus and an external coupler for an external peripheral device. An expansion coupler is also provided for coupling a second expansion card to the first card. The expansion module has a system connector for connecting the expansion module to a lower speed input-output bus of a computer system. The module can also accommodate additional SIMM modules as its associated memory. The module uses sidewalls or book covers made of a shielding material to provide electrical shielding and protection from external conditions. The expansion module improves the upgradeability and expandability of a data processing system.

11 Claims, 5 Drawing Sheets

COMPUTER EXPANSION MODULE APPARATUS

BACKGROUND OF THE INVENTION

1. Technical Field

This invention relates, generally, to data processing systems and, in particular, this invention relates to the placement of circuit board modules in data processing systems. More particularly still, this invention relates to a modular holder for IC packs that is easily replaceable.

2. Description of the Related Art

Current data processing systems require package systems that are designed to be compact and easy to service and upgrade at the end user site. The compact designs are necessary because they are easily utilized in office environments where the availability of space is limited or special environmental conditions are required by the data processing systems, such as, for example, mainframe computers and mid-range computers. In addition, data processing systems typically come with a number of options, and the end user may wish to add or remove options at any time after initial installation. It is desirable that the field service representative or end user be able to make these changes in the minimum time possible without the need for special tools.

A common method of achieving the goals of compact design and ease of field service and field upgrades is to employ a modular circuit board design. A common type of modular design provides for a main circuit board, which may be referred to as the "mother board". The mother board usually contains the basic computer circuitry essential for operation of the data processing system. One or more additional circuit boards are used to provide optional or enhanced functions. The circuit boards containing circuitry necessary to accomplish the optional functions can be referred to as "daughter boards". Daughter boards can be electrically connected to the mother board over multi-pin bus connectors.

Some modular designs also are limited in holding but a single logic card per modular cover set. Accordingly, it was not possible to have more than one logic card per modular package. Additionally, some data processing systems did not provide for a modular systems to be added or removed from the overall system. This prevented field upgrade or replacement of the logic cards.

In data processing systems today, card real estate is still at a premium; accordingly, additional expansion cards are provided where components that cannot fit on the mother board are then added. Recently, modular designs have been developed that allow for placement of more than one logic card in a modular unit. Field replacement and upgrading is still cumbersome in these designs since they do not provide for the replacement of a single card that may have failed or need upgrading, but rather require the replacement of the entire modular unit. This would require the group supporting the data processing system to store every possible combination of cards in a particular modular package.

Accordingly, what is needed is a modular package that allows multiple internal logic cards and that is easily upgradable or replaceable either through replacement of the entire modular package or by changing of any one of the internal logic cards found within the modular package. Additionally, what is also needed is a modular package that not only provides for the attachment of multiple modular cards, but also the attachment of incompatible cards, such as single in-line memory modules (SIMM), that do not fit in a standard expansion slot found in traditional data processing systems.

SUMMARY OF THE INVENTION

One object of this invention relates, generally, to data processing systems.

Another object of this invention relates to the placement of circuit board modules in data processing systems.

Still another object of this invention relates to a modular holder for IC packs that is easily replaceable.

The above as well as additional objectives, features, and advantages of the present invention will become apparent in the following detailed written description. According to the present invention, an improved expansion module for use in a computer system is disclosed. The expansion module holds a first card, which has a data processing unit and associated memory coupled together via a high speed internal local bus and an external coupler for an external peripheral device. An expansion coupler is also provided for coupling a second expansion card to the first card. The expansion module has a system connector for connecting the expansion module to a lower speed input-output bus of a computer system. The module can also accommodate additional SIMM modules as its associated memory. The module uses sidewalls or book covers made of a shielding material to provide electrical shielding and protection from external conditions.

The expansion module may be implemented in a data processing system to improve upgradeability and expandability. The data processing system typically includes a central processing unit, an input-output system bus, coupled to the central processing unit, a short term memory device, coupled to said input-output system bus, and a keyboard and video monitor for allowing a user to interface with the data processing system, which are also coupled to the central processing unit via said input-output bus. A plurality of expansion slots, each coupled to the input-output system bus, may receive the expansion module, through the system coupler of the expansion module. The data processing system may further include a rack of long-term memory storage devices, coupled to the input-output data bus.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
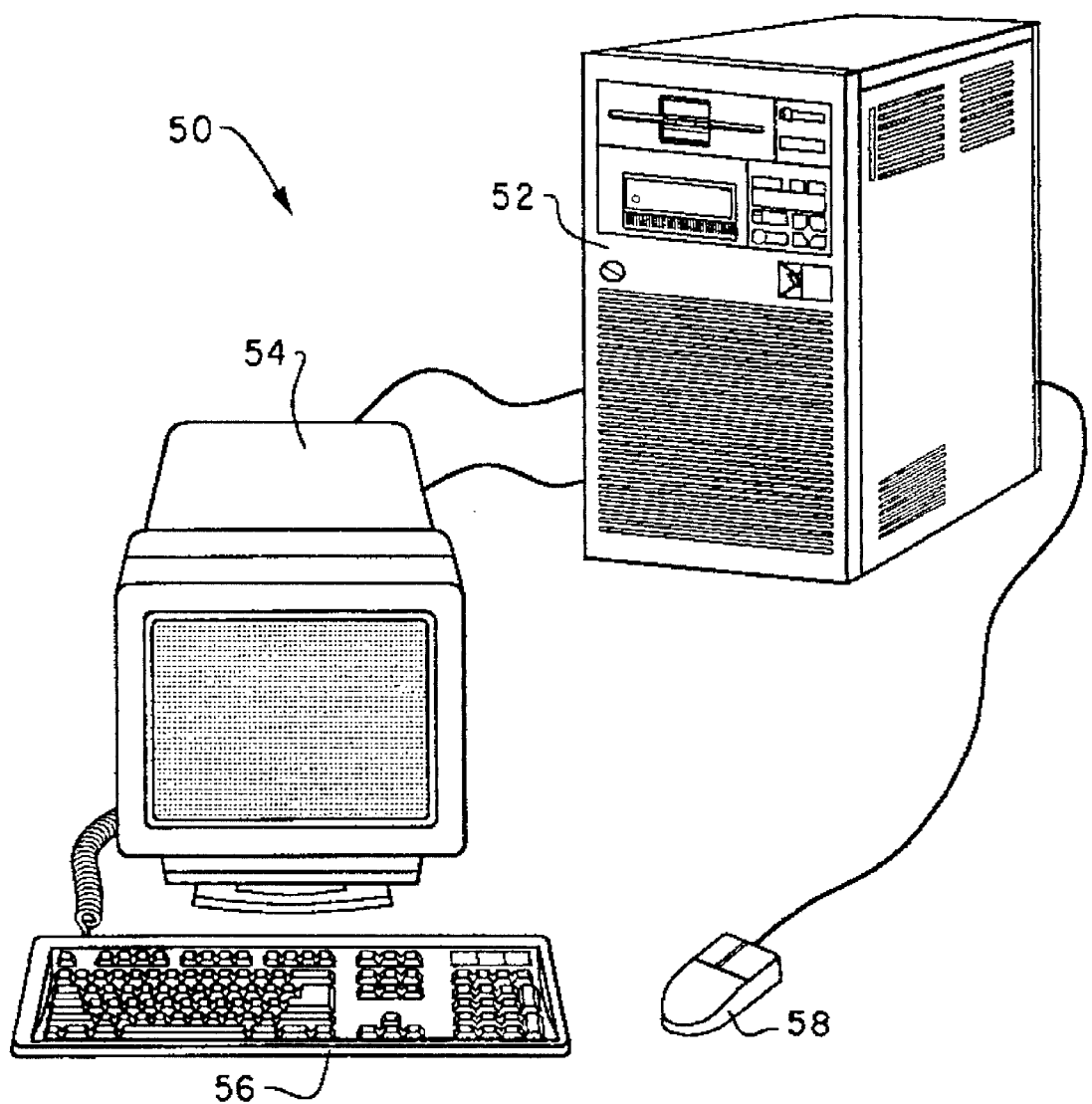
FIG. 1 is a pictorial representation of a data processing system that may be utilized to implement a method and system of the present invention.

With reference now to the figures and in particular with reference to FIG. 1, there is depicted a pictorial representation of a data processing system in which the present invention may be implemented in accordance with a preferred embodiment of the present invention. A personal computer 50 is depicted which includes a system unit 52, a video display terminal 54, a keyboard 56, and a mouse 58. Computer 50 may be implemented utilizing any suitable computer such as the IBM AS/400 computer or an IBM RISC SYSTEM/6000 computer, both products of International Business Machines Corporation, located in Armonk, N.Y. "RISC SYSTEM/6000" is a trademark of International Business Machines Corporation and AS/400 is a registered trademark of International Business Machines Corporation.

Figure 2:
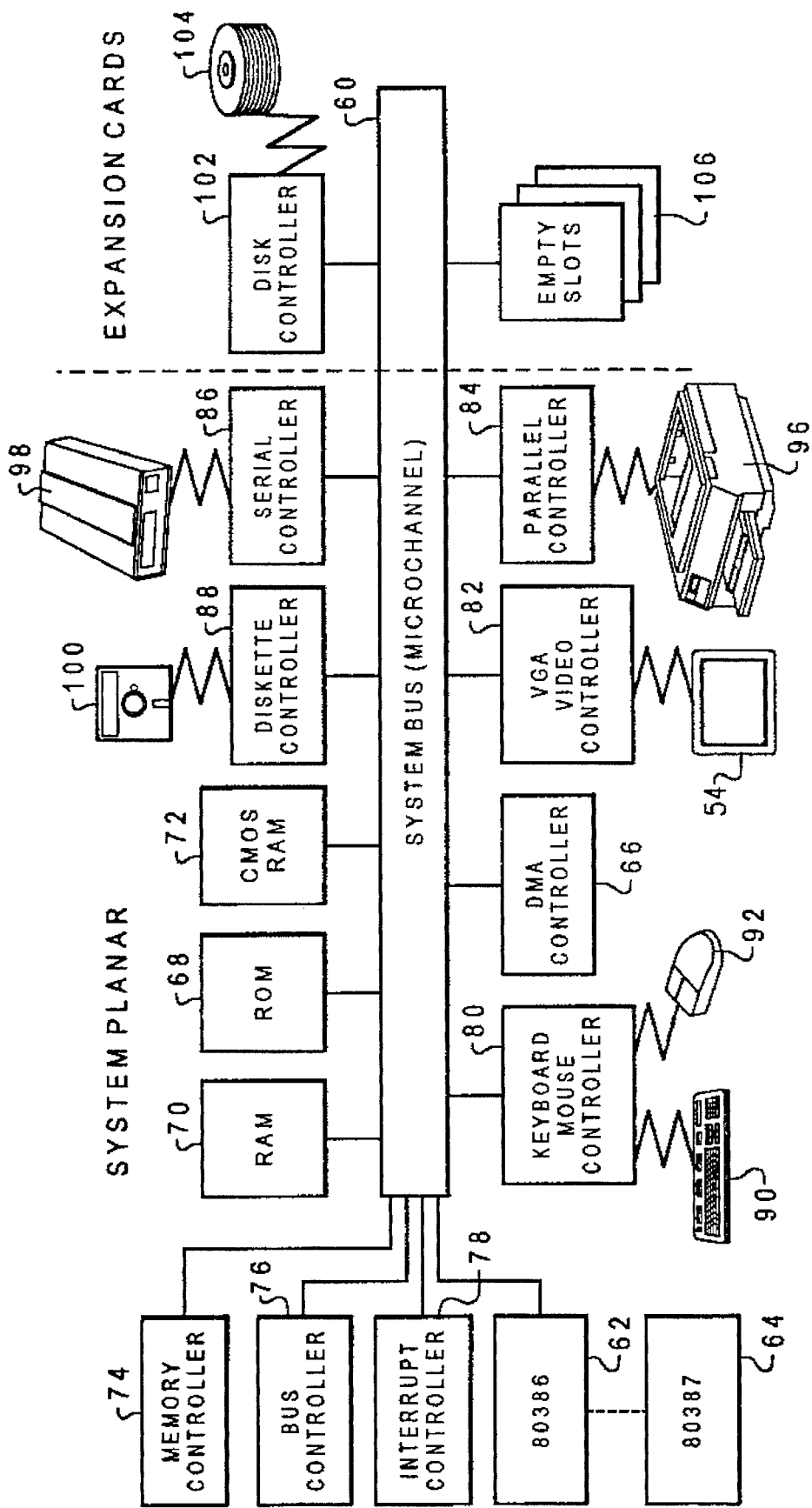
FIG. 2 depicts a block diagram of selected components in the data processing system illustrated in FIG. 1 in which a preferred embodiment of the present invention may be implemented.

Referring now to FIG. 2, there is depicted a block diagram of selected components in personal computer 50 in which a preferred embodiment of the present invention may be implemented. System unit 52 preferably includes a system bus 60 for interconnecting and establishing communication between various components in system unit 52. Microprocessor 62 is connected to system bus 60 and also may have numeric coprocessor 64 connected to it. System bus 60 may be a Micro Channel system bus from International Business Machines Corporation. "Micro Channel" is a registered trademark of International Business Machines Corporation. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard. Read only memory (ROM) 68 is mapped into the microprocessor 62 address space in the range from 640K to 1 megabyte. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 54. Parallel controller 84 provides a hardware interface for devices such as printer 96. Serial controller 86 provides a hardware interface for devices such as a modem 98. Diskette controller 88 provides a hardware interface for floppy disk unit 100. Expansion cards also may be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2 may vary for specific applications. For example, other peripheral devices such as: optical disk media, audio adapters, or chip programming devices such as a PAL or EPROM programming device, and the like also may be utilized in addition to or in place of the hardware already depicted.

Figure 3:
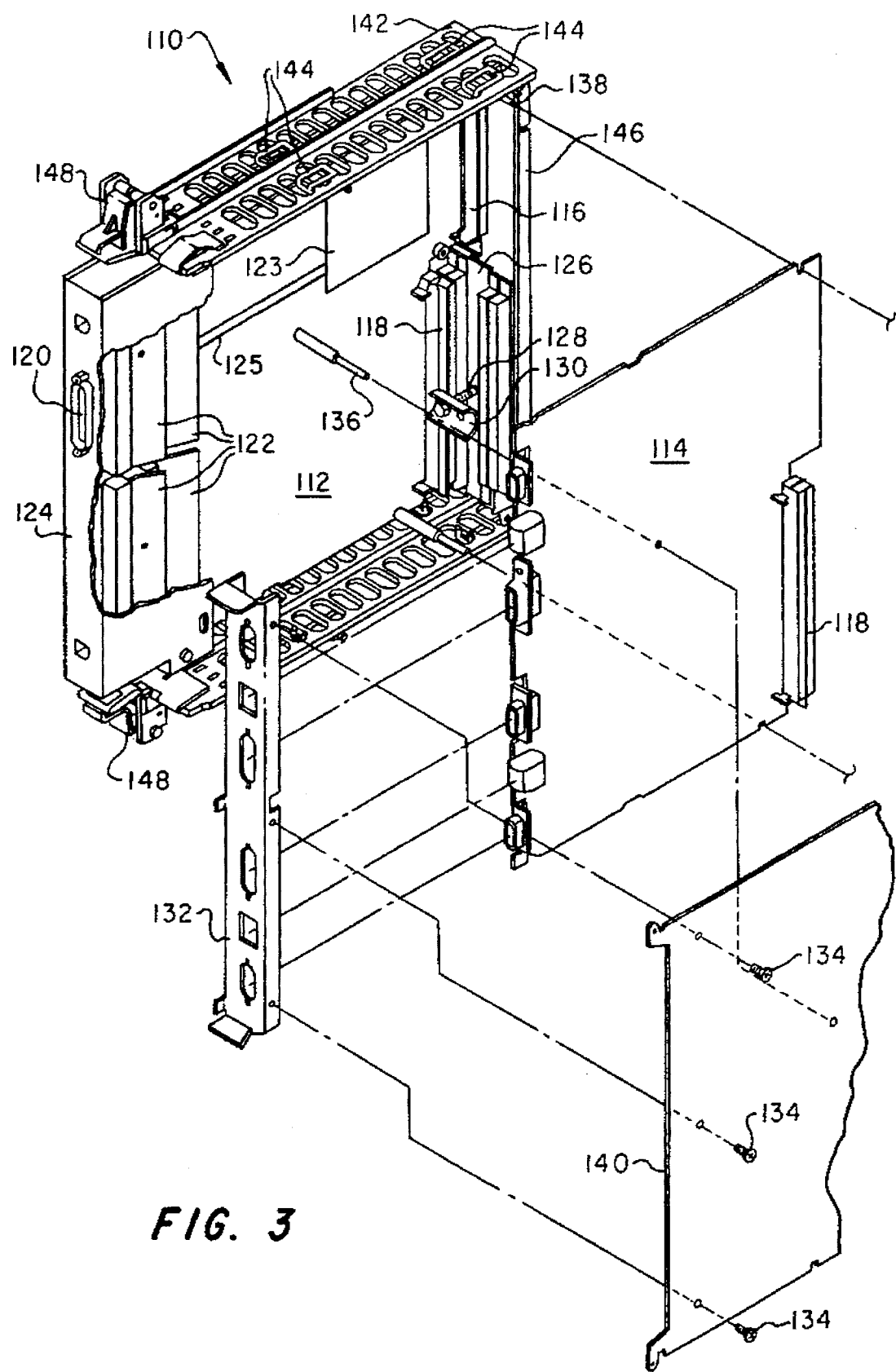
FIG. 3 is a partially exploded perspective view of a data processing system expansion module according to the present invention.
Figure 4:
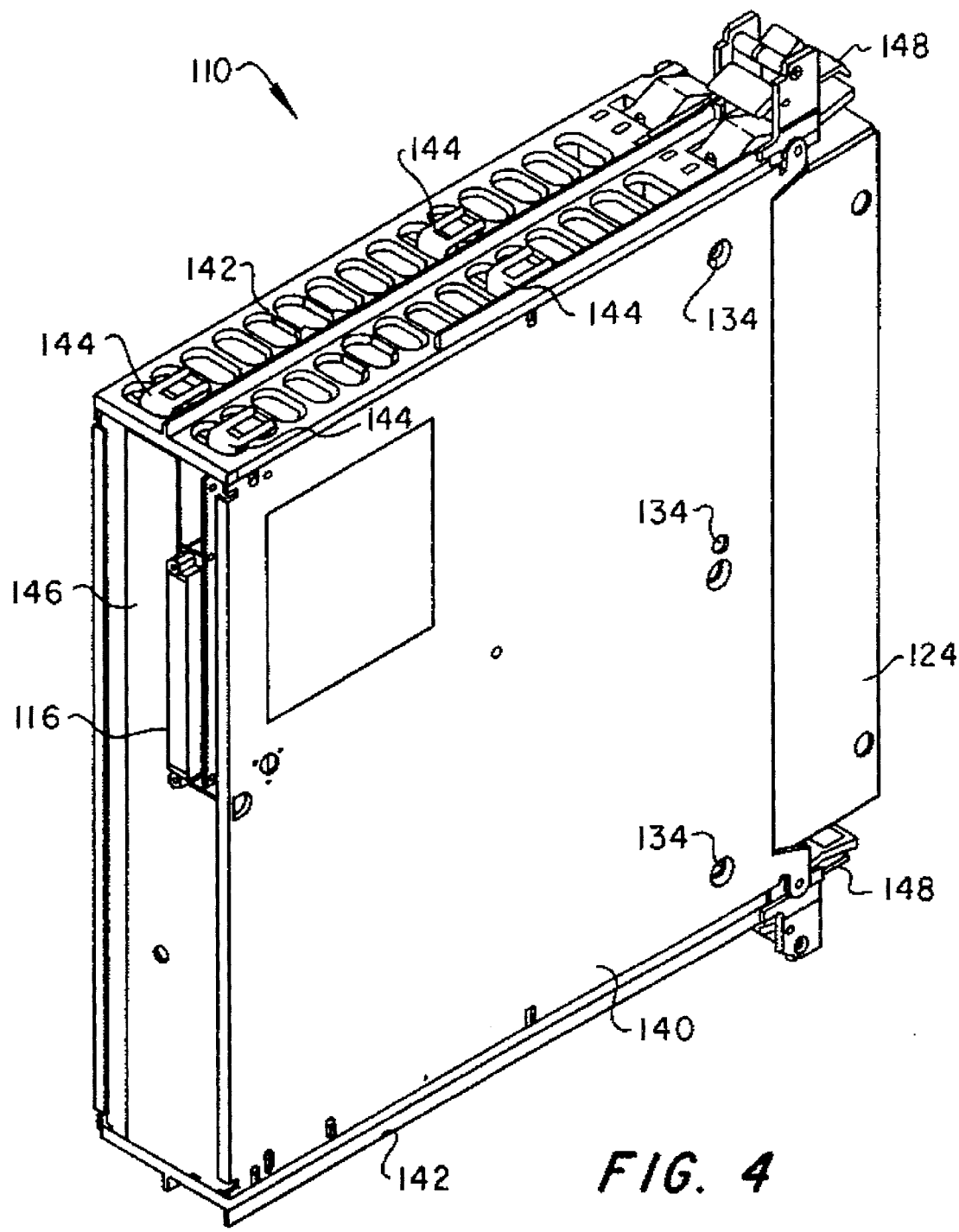
FIG. 4 is a reverse perspective view of the expansion module according to FIG. 3.

FIG. 3 is a partially exploded view of a modular unit that accepts logic cards for mounting in the data processing system of FIG. 1. The modular system or book package 110 holds a first logic card 112 and a second logic card 114. FIG. 4 is a reverse perspective view of a fully assembled book package 110 using the same corresponding numerals as depicted in FIG. 3.

Attached to the first logic card 112 is a back plane mating connector 116, which connects to any one of expansion slots 106, a crossover connector 118, and an external cable connector or communications ports 120. The second logic card also has a crossover connector 118. Logic card 112 also includes single in-line memory modules (SIMM) receptors 122 and are covered by a first tailstock 124, which mounts to the first logic card 112. The tailstock 124 is removable for access to SIMM cards placed in receptors 122 for either upgrade or field replacement. The SIMMs are mounted using a 22.5 degree connector, which allows for clearance between the tailstock 124 and the SIMMS themselves, as well as clearance between the SIMMS and the second logic card 114.

Figure 5:
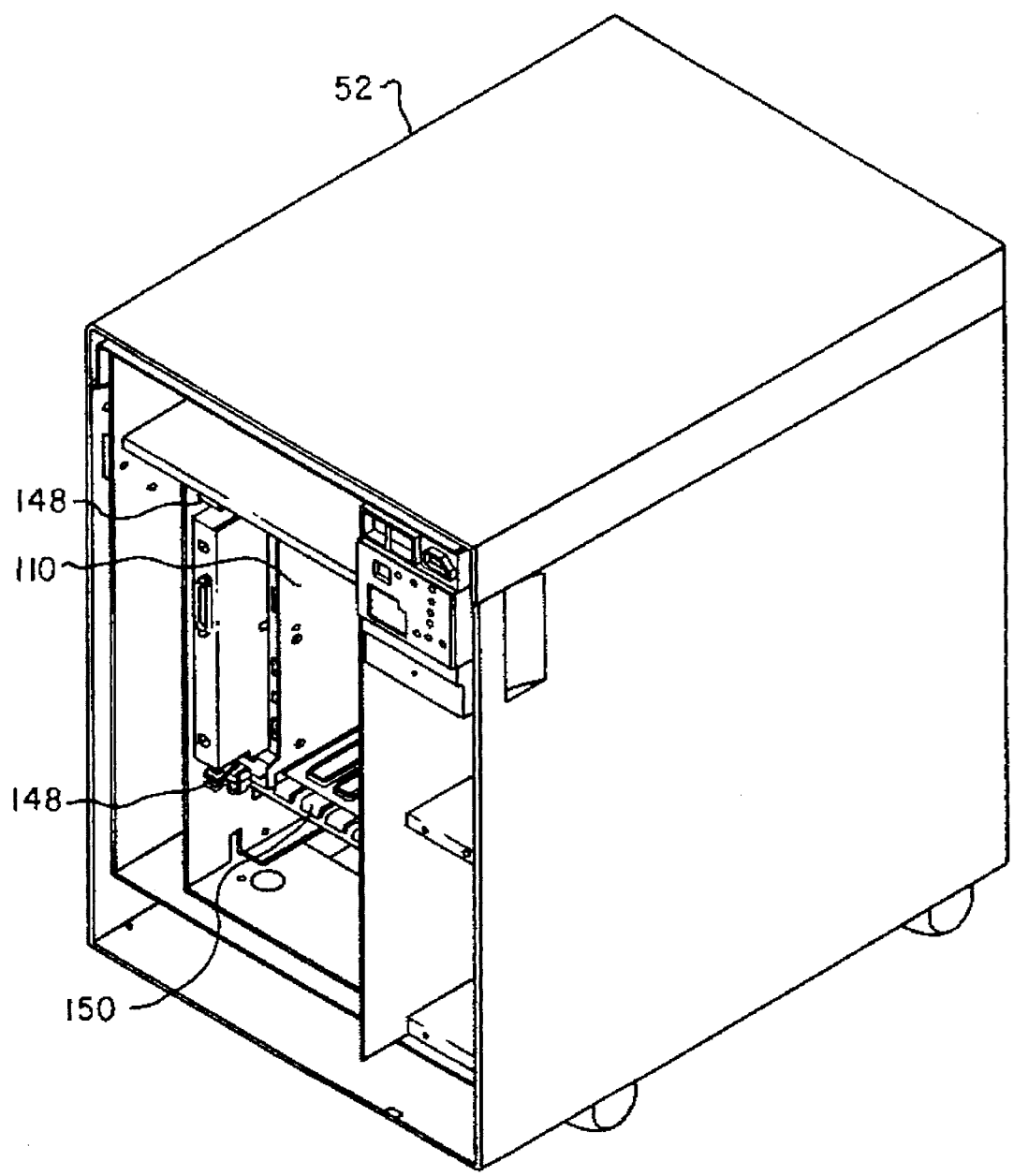
FIG. 5 is a perspective view of an expansion module seated inside a data processing system.

The first logic card 112, which contains the SIMM receptors 122, also includes a microprocessing unit or CPU 123. CPU 123 is connected to the memory modules via a high speed local bus 125 as compared to system bus 60. This arrangement allows for faster processing speeds to be conducted on the card rather than having to access memory off the card in the main system or to access a microprocessor off the card in the main system via the system bus. This also conserves the number of input/output pins required for interfacing with either second logic card 114 or with the main data processing system once attached therein as illustrated in FIG. 5 and is described below.

A crossover card 126 is used to connect electrically the power and signals from the first logic card 112 to the second logic card 114 via the crossover connector 118.

The second logic card 114 is not necessarily the same size as the first logic card 112. The second logic card 114 allows external cables a given amount of bend radius, for example, of about four inches of overmold or cable bend, or both, when installed into the data processing system. The crossover card 126 can be removed or installed via a jack screw 128 and a jack screw stiffener 130, or other mechanical means, such as, for example, a clip arrangement or socket design. The assembly means, such as jack screw 128 and jack screw stiffener 130, allows for field replacement of either the first logic card 112 or the second logic card 114 or the SIMMS. A second tailstock 132 is attached to the second logic card 114. The first tailstock 124 attaches to the second tailstock 132 using screws 134, or other similar fasteners or snaps.

A vibration post 136 and card adapter 138 attach to the logic cards 112 and 114 and fix the logic cards between a pair of book covers 140. Vibration post 136 and card adapter 138 also provide a set spacing between the first and second logic cards. A pair of book rails 142 attach on the top and bottom edges of book covers 140 and are retained by rail clips 144, or other type fastening means. A connector plate 146 also attaches to the book covers 140 for added protection and ruggedness. A pair of module connectors 148 are applied to the top and bottom rear portions of book package 110. Module connectors 148 provide secure fastening to the data system, via connect or supports 150 which is illustrated in FIG. 5.

The book covers 140 are made from such materials as, for example, shielding metal, for providing electrical isolation for the logic cards and memory modules stored within the book package 110. The book covers also protect the cards from mechanical or electrostatic damage, or both. The design of the book package 110 also assures that the logic card connectors are properly aligned to the back plane connector for attachment within the data processing system.

While the invention has been particularly shown and described with reference to a preferred embodiment, it will be understood by those skilled in the art that various changes in form and detail may be made therein without departing from the spirit and scope of the invention.

We claim:

1. A computer system expansion module for connection to a computer system main board via an expansion slot, comprising:

a first card having a data processing unit and associated memory coupled together via a high speed internal local bus;

means for connecting a second expansion card to said first card; and means for externally connecting said expansion module to a lower speed input-output bus of a computer system.

2. The computer system expansion module according to claim 1 wherein said associated memory is a single inline memory module.

3. The computer system expansion module according to claim 1 further comprising side enclosures that provide electrical shielding.

4. The computer system expansion module according to claim 1 wherein said first card further comprises a communications port for coupling a peripheral device to said computer system.

5. A data processing system having improved upgradeability and expandability, comprising:

a central processing unit;

an input-output system bus, coupled to said central processing unit;

a short term memory device, coupled to said input-output system bus;

means for allowing a user to interface with said data processing system, coupled to said central processing unit via said input-output bus;

a plurality of expansion slots, each coupled to said input-output system bus;

an expansion module, coupled to one of said plurality of expansion slots, comprising:

a first card having a data processing unit and associated memory coupled via an internal local bus operating at a bus speed faster than said input-output bus;

means for connecting a second expansion card to said first card; and means for externally connecting said expansion module to said input-output system bus of said data processing system.

6. The data processing system according to claim 5 further comprising a rack of long-term memory storage devices, coupled to said input-output data bus.

7. The data processing system according to claim 5 wherein said user interface means comprises a keyboard for allowing data input by the user.

8. The data processing system according to claim 5 wherein said user interface means comprises a video monitor for provide data output to the user.

9. The data processing system according to claim 5 wherein said user interface means comprises a printer for providing data output to the user.

10. The data processing system according to claim 5 wherein said expansion slots have a data bus of at least 32 bits wide.

11. The data processing system according to claim 5 wherein said associated memory on said first card include SIMM-compatible connectors.

* * * * *